Dec. 27, 1955  S. ÖBERG ET AL  2,728,316
COMBINED SHEARING AND PRESSING TOOL
Filed Oct. 9, 1951  3 Sheets-Sheet 3
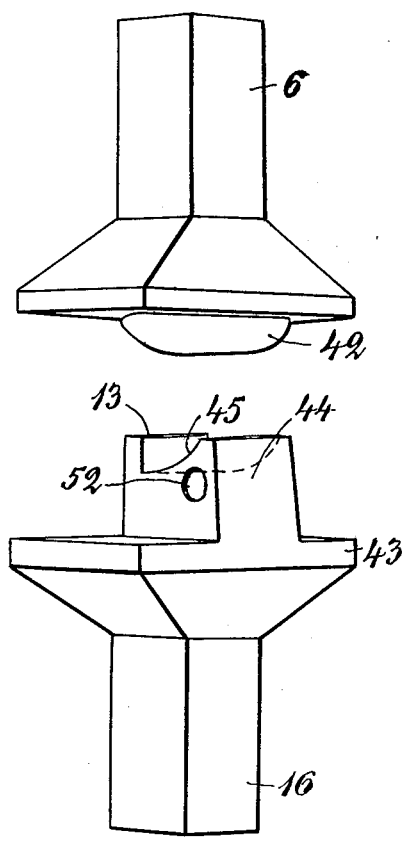
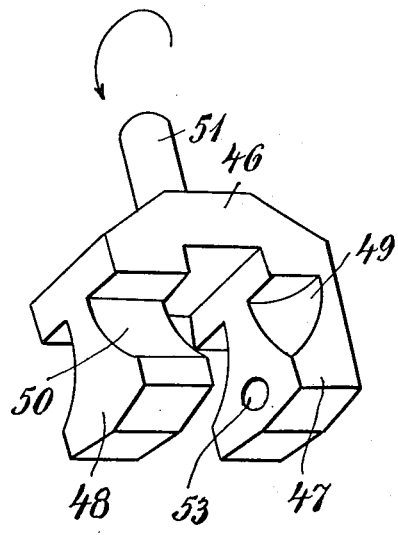
Inventors
Sven Öberg
Sven Magne Alvar Nicklasson

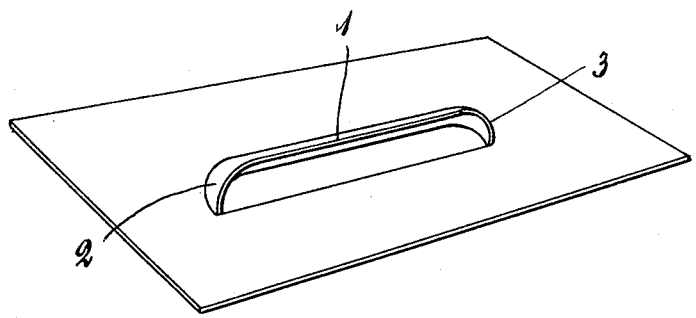
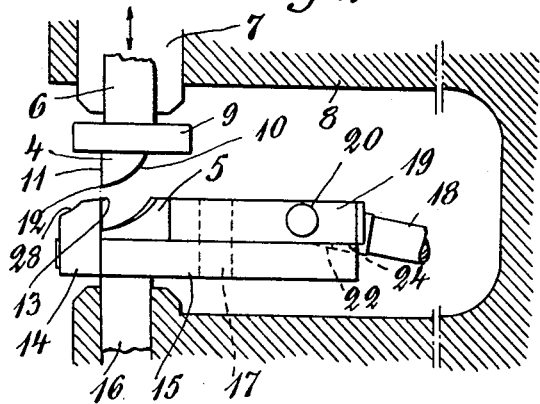
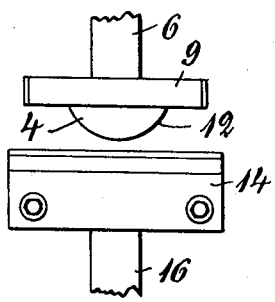
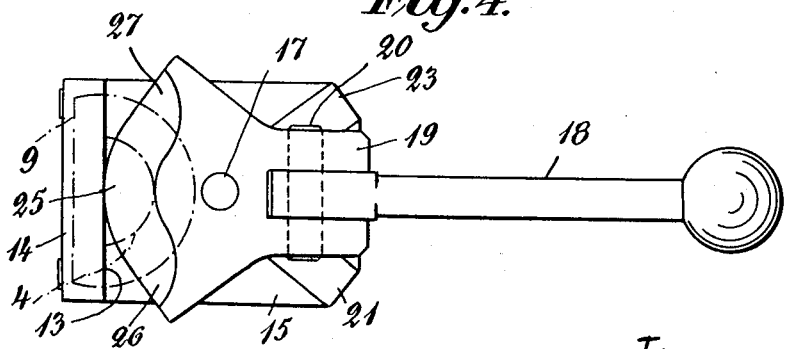

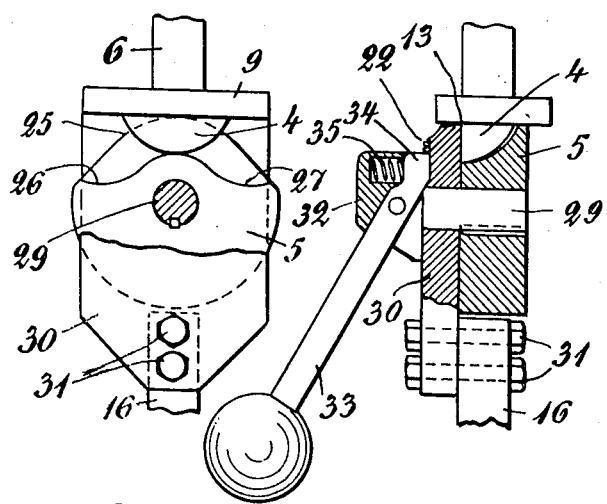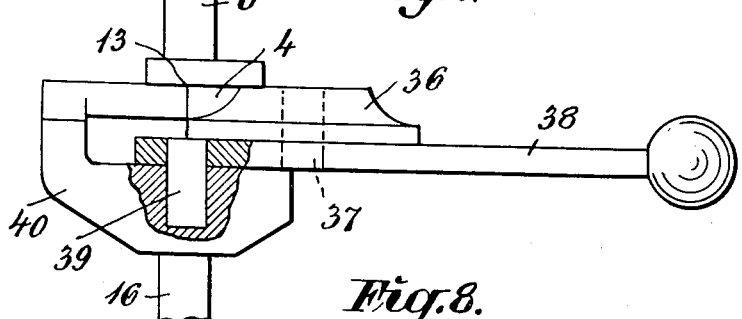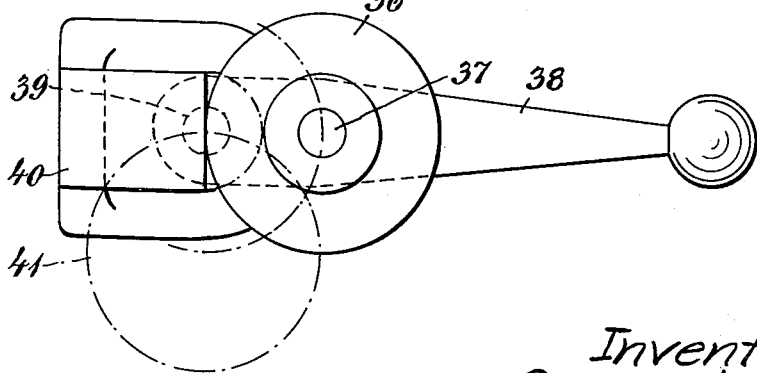

United States Patent Office 2,728,316
Patented Dec. 27, 1955

2,728,316
COMBINED SHEARING AND PRESSING TOOL

Sven Öberg and Sven Magne Alvar Nicklasson, Goteborg, Sweden, assignors to Aktiebolaget Svetsmekano, Goteborg, Sweden Application October 9, 1951, Serial No. 250,514

Claims priority, application Sweden August 31, 1951

7 Claims. (Cl. 113—42)

The present invention refers to a combined shearing and pressing tool, which is particularly intended to be used for the production of ventilation openings, or so-called gill openings, in sheet-metal or other plastic materials. Such ventilation openings are produced by first cutting a straight incision in the sheet-metal and by then working one edge portion along the incision by pressing, the edge portion thus pressed out then showing a straight intermediate part of an arcuate outline and with rounded end portions connected to the plane portion of the sheet-metal at the ends of the incision. Hitherto this pressing operation would generally be performed by working the entire edge portion along the incision at the same time while pressing the plate between a punch and a die having a press form corresponding to the desired shape of the gill opening. In such work, however, the strongly bent edge portions are subjected to heavy strains that may cause breaks of the sheet-metal at the ends of the incision.

The present invention has for its object to provide a tool which will facilitate a sparing treatment of the sheet-metal at the ends of the gill opening. To this end, the portions of the punch corresponding to the end portions are adjustable, according to the invention, relatively to the die in such manner as to permit of being brought individually into working position for the working of the corresponding end portion. Preferably, the die is also provided with a stationary or movable intermediate part, against which the straight edge portion of the gill opening may be moulded. According to a suitable form of embodiment, said intermediate part and end portions of the die may be formed integral, the entire structure thus obtained being adjustably and preferably also pivotally arranged so as to permit of being adjusted into different angular positions for the purpose of successive working of the intermediate portion and the end portions of the plate edge. A tool of said type may be used to advantage in such plate shears or presses where the movable part of the tool is adapted to perform rapid oscillatory strokes. Said movable part is then preferably made according to the invention as a combined cutting and pressing tool so as to permit of being used both for the cutting of the incision and for the moulding of the edge portion of the incision.

The invention will be described more closely with reference to the accompanying drawings, which illustrate different embodiments of a tool according to the invention. Fig. 1 is a perspective view of a plate with a gill opening of the ordinary configuration. Fig. 2 shows a combined cutting and pressing tool consisting of a punch and a die, said tool being represented in vertical projection and in vertical section. Fig. 3 shows the tool viewed from one end thereof. Fig. 4 is a plan view of the die. Figs. 5 and 6 show a combined tool according to a second embodiment in vertical projection and in vertical section, respectively. Figs. 7 and 8 show a third embodiment in elevation and in a plan view, respectively. Fig. 9 shows a fourth embodiment of the tool. Fig. 10 shows the adjustable part of the die for the last-mentioned tool in a perspective view.

As will appear from Fig. 1, the punched edge portion of the gill opening has a straight intermediate part 1 of a substantially cylindrical configuration and two rounded end portions 2, 3 connected with their inwardly curved edges to the plane plate at the ends of the gill opening.

In the embodiments shown in Figs. 2, 3 and 4, the tool consists of a punch 4 and a die 5. The punch 4 is secured by means of a square stud 6 in a vertically movable tool holder 7 in the upper part of the machine frame 8. The punch is provided with a flange 9 located above the same, said flange having a plane lower side caused to bear on the plate to be operated upon at the vertical reciprocating movement of the punch. The punch is limited on the inside thereof by a surface of revolution 10, such as a spherical surface, with an axis paralleling the direction of movement of the punch. The punch is limited on the front side thereof by a plane surface 11 paralleling the direction of movement of the punch. The line of intersection between the two surfaces 10, 11 forms a circular edge 12, by means of which the punch may be used at the same time as a cutting tool for the cutting of incisions in the plate material. Said edge cooperates with an edge 13 on a cross piece connected through a plate 15 to a square stud 16 secured in the lower part of the machine frame. The plate 15 serves as a base for the die 5, which is swingably mounted on the plate 15 by means of a vertical pin 17. The die may thus be adjusted into different angular positions relatively to the punch by being turned about said pin. In the example shown, the die is intended to be adjusted into and locked in three different angular positions, for which purpose the die is provided with a handle 18, which is swingably connected to the rear part 19 of the die by means of a horizontal pin 20. Provided at the rear edge of the plate 10 are three channel-like recesses 21, 22 and 23 extending radially from the pin 17, the inner end 24 of the handle 18 permitting of being lowered into said recesses to arrest the die in three corresponding positions.

As will be seen from Figs. 2 and 4, the front edge portion of the die is formed in correspondence to the shape of the edge portion of the gill opening. It thus presents an intermediate portion 25 of an outline corresponding to the straight part 1 of the edge portion of the gill opening, and two portions 26, 27 formed in correspondence to the end portions 2 and 3, Fig. 1.

The production of a gill opening proceeds as follows. The plate is introduced between the punch and the die so that it will rest on the die and the cross piece 14. The plate is then advanced in a horizontal direction underneath the punch, a straight incision being thus cut in the plate. During this procedure the die takes the vertical position shown in the drawing with the handle 18 in its intermediate position. After that the die 5 and the plate 15 are raised with the aid of a screw mechanism cooperating with the stud 16, but not shown in the drawing, onto a level suited for the pressing operation, the punch 4 then lying approximately on the middle of the gill opening. The pressing operation is then performed at a displacement of the plate, first in one direction and then in the opposite direction, along the edge 13 while the die 5 is being turned by means of the handle, so that the corresponding end portions of the die, 26 and 27 respectively, will be brought into operative position for the moulding of the end portions 2, 3 of the gill opening. The straight intermediate part 1 of the edge portion of the gill opening will then be moulded by the plate being successively pressed down against the intermediate part 25 of the die.

Instead of raising the die onto a level suited for the pressing operation, the tool holder 7 may, on the shearing operation having been effected, be adjusted to a greater length of stroke adapted to the pressing operation, whereupon the latter may be effected in the manner above described.

For the cutting and punching of the next gill opening the plate is displaced toward the left in Fig. 1, a curved end surface 28 of the cross piece 14 then serving as a support for the pressed-out portion of the plate to secure a predetermined distance between the gill openings.

The form of embodiment shown in Figs. 5 and 6 differs from that above described substantially only that the die 5 is swingable about a horizontal axis by means of a pin 29 secured in the die and mounted in a vertical plate 30, which is in turn secured by means of bolts 31 in an extension of the stud 16. The pin 29 is provided with a head 32, in which the handle 33 is swingably mounted in such manner that the upper end 34 thereof may at the same time serve as a locking member to lock the die in three different positions of adjustment in a manner similar to that indicated in Figs. 2–4. The end 34 of the handle is kept in locking engagement by means of a spring 35. The operative part of the die is formed in a similar manner as in Figs. 2–4 with an intermediate part 25 and two end parts 26, 27, which owing to the configuration of the punch 4 as a body of revolution, which is symmetrically arranged relatively to the vertical plane extending through the pin 29, may co-operate with said parts of the die to shape the edge portions of the gill opening.

In the embodiments shown in Figs. 7 and 8, the die consists of a disk 36, which is pivotally mounted on a shifting arm 38 by means of a pin 37, said arm 38 being in turn swingably mounted about a pin 39, which is secured in a die holder 40. The operative part of the die has the shape of a body of revolution with a generatrix corresponding to the outline of the punch 4. The die may be adjusted into different angular positions by being swung about the pin 39. In shaping the straight part of the edge portion of the plate the die takes the position shown by full lines in the drawing. In working the end portions the die is shifted by 90° in the one or the other direction, as indicated by a chain-dotted circle 41 in Fig. 8. Obviously, the plate will then only be supported along a generatrix on the lower side of the plate, but if required, the angular position of the die may be changed in the working of the end portions by turning the handle 38.

In the embodiments shown in Figs. 9 and 10, the punch 42 is of an elongated shape with a straight and cylindrical intermediate portion and with rounded end portions corresponding to the configuration of the edge portion of the gill opening. However, the punch 42 is of a smaller length than the gill opening. In this example of embodiment, the operative part of the die consists of a member 44 rigidly arranged on the holder 43 and provided with a straight recess 45 with a cylindrical bottom surface corresponding to the straight part of the plate edge, and of a movable or shiftable member 46 in the form of a yoke with two shanks 47, 48. The one shank 47 is provided with two recesses 49 located on opposite sides and corresponding with respect to their shape to the end portions of the pressed-out part of the plate. The other shank 48 is provided with two recesses 50 located on opposite sides and having a cylindrical bottom surface corresponding to the outline of the straight part of the plate edge. The member 46 is provided with a stud 51 centrally arranged in the intermediate member of the yoke and permitting of being used as a handle. The member 46 is adapted to be arranged on the holder 43 so that the shanks 47, 48 are caused to grip about the rigid member 44, while the recesses 45, 49 and 50 are aligned with one another. In this position, the yoke may be arrested by means of a pin or a snap lock inserted through apertures 52, 53.

In the cutting of the incision in the plate the yoke 46 is removed from its place on the holder 43. After that the intermediate part of the edge portion of the gill opening is moulded over the rigid member 44 of the die. Finally, the loose member 46 is inserted in its place, whereupon the one end portion of the pressed-out edge of the plate is moulded against the recess 49. The other end portion is moulded in a similar manner, after the loose member 46 has been loosened and turned by 180°, so that the shank 47 is brought to the opposite side of the intermediate part 44.

The invention is not restricted to tools constructed both for shearing and for pressing, but may also be applied in a general way for the moulding of channel-like swells with rounded end portions without any slitting of the plate.

We claim:

1. A sheet-metal pressing tool for use in forming slit swells having a straight intermediate portion and rounded end portions, comprising a punch arranged to perform a rectilinear reciprocating movement and having a cutting edge forming the line of intersection between a plane surface located in the cutting plane and an opposed pressing surface of a configuration conforming to the curvature of the intermediate and end portions of the swell to be pressed out, a stationary cutting edge member for cooperation with the cutting edge of the punch, and a die having a mould surface of a configuration conforming to that of the punch, the lateral distance between the end portions of the pressing surface of the punch being less than the lateral distance between the end portions of the moulding surface of the die, said die being movable transversally of the direction of movement of the punch and adapted to be set alternately and successively in an intermediate position for cutting an incision along one edge of the swell and moulding the intermediate portion of the swell, and in two end positions for moulding the end portions of the swell.

2. A sheet-metal pressing tool for use in forming slit swells having a straight intermediate portion and rounded end portions, comprising a punch arranged to perform a rectilinear reciprocating movement and having a cutting edge forming the line of intersection between a plane surface located in the cutting plane and an opposed pressing surface of a configuration conforming to the curvature of the intermediate and end portions of the swell to be pressed out, a stationary cutting edge member for cooperation with the cutting edge of the punch, and a die swingable about an axis parallel with the direction of movement of the punch, the mould surface of the die having end portions conforming to the end portions of the swell and an intermediate portion shaped in the form of a circular arc having its center on said axis, the lateral distance between the end portions of the pressing surface of the punch being less than the lateral distance between the end portions of the moulding surface of the die, said die being swingable about said axis to move said mould surface transversally of the direction of movement of the punch and adapted to be set alternately and successively in an intermediate position for cutting an incision along one edge of the swell and moulding the intermediate portion of the swell, and in two end positions for moulding the end portions of the swell.

3. A sheet-metal pressing tool for use in forming slip swells having a straight intermediate portion and rounded end portions, comprising a punch arranged to perform a rectilinear reciprocating movement and having a cutting edge forming the line of intersection between a plane surface located in the cutting plane and an opposed pressing surface of a configuration comprising part of a surface of revolution, the axis of which is parallel with the direction of movement of the punch, a stationary cutting edge member for cooperation with the cutting edge of the punch, and a die having a mould surface of a configuration conforming to that of the punch, the lateral distance between the end portions of the pressing surface of the punch being less than the lateral distance between the end portions of the moulding surface of the die, said die being movable transversally of the direction of movement of the punch and adapted to be set alternately and successively in an intermediate position for cutting an incision along one edge of the swell and moulding the intermediate portion of the swell, and in two end positions for moulding the end portions of the swell.

4. A sheet-metal pressing tool for use in forming slit swells having a straight intermediate portion and rounded end portions, comprising a punch arranged to perform a rectilinear reciprocating movement and having a cutting edge forming the line of intersection between a plane surface located in the cutting plane and an opposed pressing surface forming part of a surface of revolution, the generatrix of which conforms to the swell to be pressed out and the axis of which is parallel with the direction of movement of the punch, a stationary cutting edge member for cooperation with the cutting edge of the punch, and a movable die having a mould surface comprising intermediate and end portions of a configuration conforming to that of the swell to be cut, said die being swingable about an axis parallel with the direction of movement of the punch and adapted to be set in an intermediate position for cutting an incision along one edge of the swell and moulding the intermediate portion of the swell, and in two end positions for moulding the end portions of the swell, the end portions of the mould surface of the die being laterally displaced so as to be inoperative in the intermediate position of the die.

5. A sheet-metal pressing tool for use in forming slit swells having a straight intermediate portion and rounded end portions, comprising a punch arranged to perform a rectilinear reciprocating movement and having a cutting edge forming the line of intersection between a plane surface located in the cutting plane and an opposed pressing surface of a configuration conforming to the form of the swell to be pressed out, a stationary cutting edge member for cooperation with the cutting edge of the punch and a movable die having intermediate and end portions of a configuration conforming to that of the punch, said die being swingable about an axis at right angles to the direction of movement of the punch and adapted to be set in an intermediate position for cutting an incision along one edge of the swell and moulding the intermediate portion of the swell, and in two end positions for moulding the end portions of the swell, the end portions of the mould surface of the die being laterally displaced so as to be inoperative in the intermediate position of the die.

6. A sheet-metal pressing tool for use in forming slit swells having a straight intermediate portion and rounded end portions, comprising a punch arranged to perform a rectilinear reciprocating movement and having a cutting edge forming the line of intersection between a plane surface located in the cutting plane and an opposed pressing surface forming part of a surface of revolution, the generatrix of which conforms to the curvature of the swell to be pressed out and the axis of which is parallel with the direction of movement of the punch, a stationary cutting edge member for cooperation with the cutting edge of the punch, and a movable die swingable about the axis of revolution of the pressing surface of the punch and having a mould surface in the form of a surface of revolution the axis of which is parallel with the direction of movement of the punch and located laterally of the path of movement thereof, and the generatrix of which conforms to the generatrix of the pressing surface of the punch, said die being adapted to be set in an intermediate position for cutting an incision along one edge of the swell and moulding the intermediate portion of the swell, and in two end positions for moulding the end portions of the swell.

7. A pressing tool as claimed in claim 6, in which the moulding surface of the die forms an annular surface of a disk or roller pivotally mounted on a lever, which is swingable about the axis of the pressing surface of the punch.

References Cited in the file of this patent

UNITED STATES PATENTS

| | | |
|---|---|---|
| 526,526 | Grannis | Sept. 25, 1894 |
| 1,038,714 | Bartholomew | Sept. 17, 1912 |
| 1,353,524 | Fleming et al. | Sept. 21, 1920 |
| 1,773,522 | Delery | Aug. 19, 1930 |
| 2,303,059 | Misfeldt | Nov. 24, 1942 |
| 2,426,446 | Funk | Aug. 26, 1947 |
| 2,440,599 | Colwell | Apr. 27, 1948 |